Patented Jan. 10, 1939

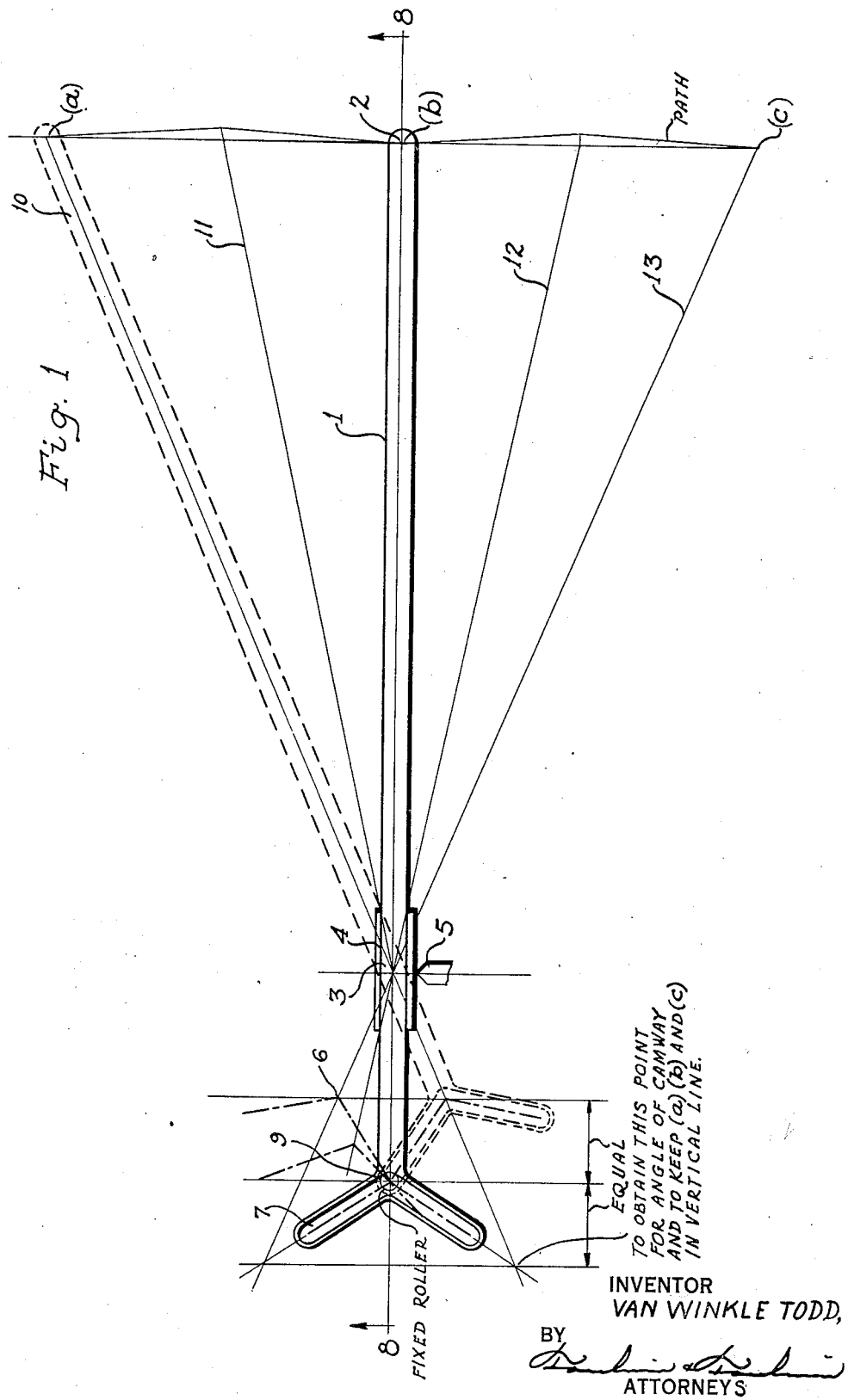

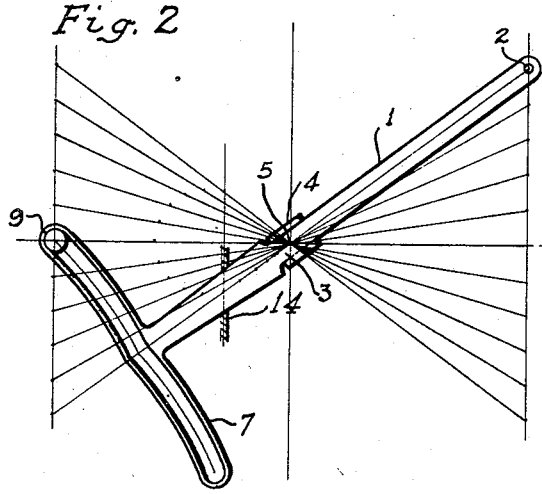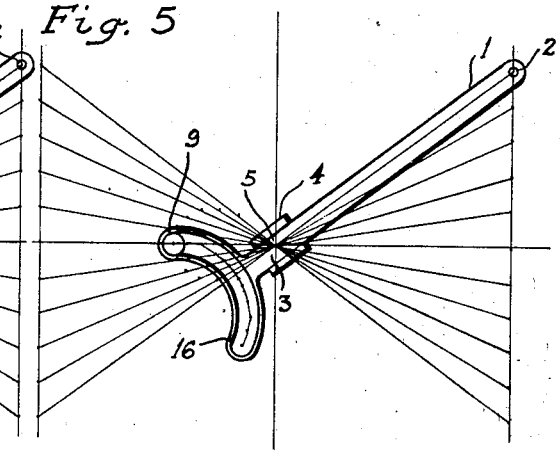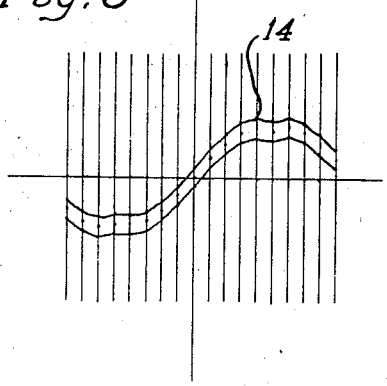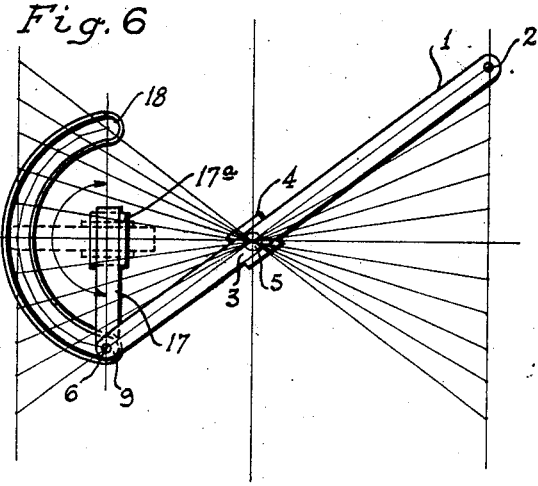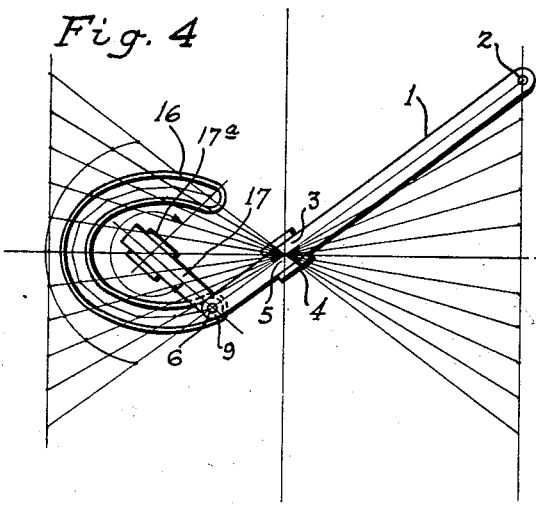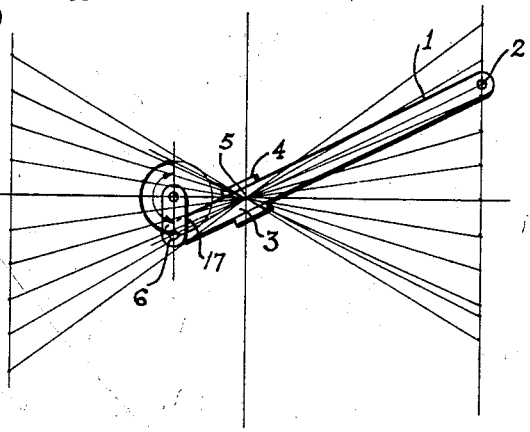

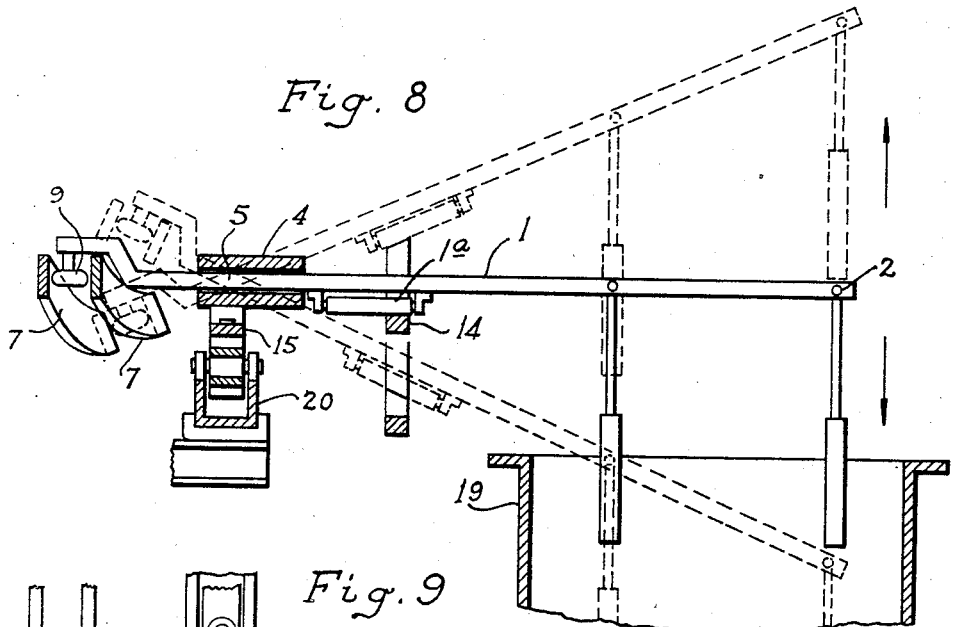
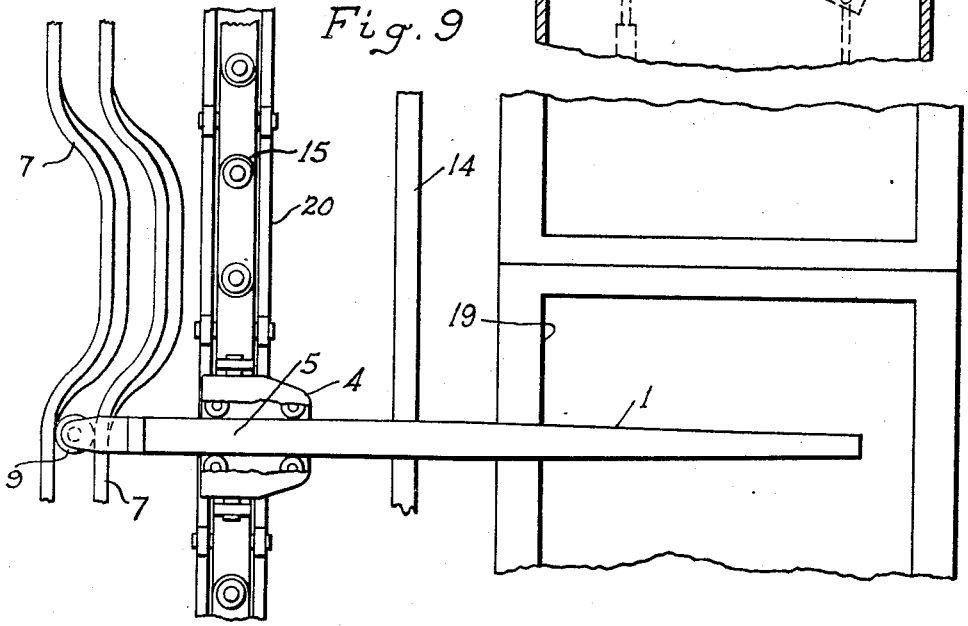
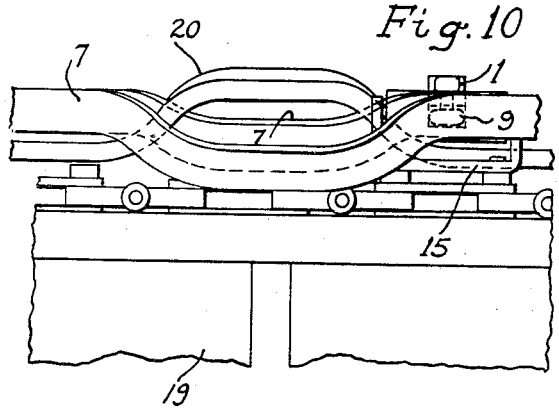
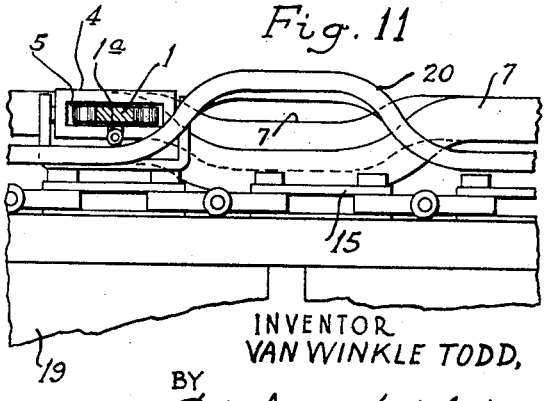

2,143,118

UNITED STATES PATENT OFFICE 2,143,118

SIDE ARM CONSTRUCTION

Van Winkle Todd, Matawan, N. J., assignor to Hanson-Van Winkle-Munning Company, Matawan, N. J., a corporation of New Jersey Application May 18, 1937, Serial No. 143,330

5 Claims. (Cl. 214—17)

My invention relates to a mechanical movement in which the outer end of a swinging arm, which is pivoted near the inner end, can be made to move in a straight line or a substantially straight line as the free end of the lever arm swings.

It is an object to provide such a mechanism and such a movement in which the arm is slidable in its pivotal support.

It is a further object to provide a cam or other means for controlling the position of the arm in its pivotal support as the arm swings about its pivot, so that the free end of the arm will always travel in a straight or substantially straight line.

It is an object of this invention to provide means for moving a lever arm through an appreciable arc while maintaining the end of the arm in such a position as to travel in a straight or substantially straight line.

It is a further object to provide a compound lever system for performing the same object.

It is an object to provide in a conveyor, and in particular, in a conveyor for an electroprocessing machine, an arm for supporting work pieces to be treated in tanks, which arm can be conveyed with a conveyor chain and which is automatically lowered, held in a horizontal position, or raised, for transfer from tank to tank, while at the same time, the free end of the arm moves in a straight or substantially straight path. This permits of a relatively narrow tank being used, without reducing the number or quantity of the articles being treated that are suspended from the arm. It permits of always maintaining the articles over the tank, so that any dripping from the articles will return to the tank.

It is an object to provide the combination of a moving chain, a lever arm, means of pivotally supporting the arm on the chain, and means of raising and lowering the arm through an arc while at the same time, adjusting it transversely of the chain, in order to maintain the outer end of the arm as it travels always in a vertical or substantially vertical pathway. This movement is of great advantage in an electroprocessing machine, in that the free end of the arm travelling in a straight line will always maintain the articles supported on the arm over the tank. All of the operating mechanism, including the chains, cams and the like, are to one side of the tank and only slightly above the tank. Therefore, no grease or other material can fall into the tank to contaminate it, and the machine will only occupy the minimum of vertical space. The tank itself can be made narrower than customary for the same number of articles being transported through the tank, so that the over-all width of the machine will not be any greater than present machines, and probably narrower than present machines for equivalent capacity.

Referring to the drawings:

Figure 1 is a diagrammatic view of an arm pivotally supported for rotating and sliding movement, with a cam associated with the end of the arm and a cam member or cam rod, so that the outer end of the arm, as it tends to swing in the arc of a circle, is adjusted so that it will move in a substantially straight path.

Figure 2 is a similar view showing a camway for guiding the arm, so that as it is raised and lowered it will retract or advance in order to have the outer end of the arm move in a straight line, and a camway for actuating the arm about its pivotal axis to cause it to rotate about such axis.

Figure 3 is a layout of the last-mentioned camway for raising and lowering the arm.

Figure 4 is a diagrammatic view showing the adjustable pivot arm with its compensating cam and a supplementary lever for causing the arm to follow in the camway and to be raised and lowered about its pivotal support.

Figure 5 is a modification of the camway.

Figure 6 is another view showing a modification of Figure 4.

Figure 7 is a still further modification of Figure 6.

Figure 8 is a side elevation of the conveyor arm as adapted to an electroprocessing machine, showing the conveyor chain support, the conveyor chain, the pivotal and slidable mounting for the arm, and the cam system for lowering the outer end of the arm below the horizontal plane for maintaining it in horizontal plane and for elevating it above the horizontal plane, and during all of such operations maintaining the outer end of the arm in a straight or substantially straight pathway.

Figure 9 is a top plan view thereof.

Figure 10 is an outside elevation thereof.

Figure 11 is an inside elevation thereof, showing the arm in section.

Referring to the drawings in detail, 1 is a lever arm in the nature of a cantilever lever, the outer end of which is designated 2. Adjacent its inner end, as at 3, it is slidably mounted in the slide 4, which is pivotally supported at 5.

The inner end of the lever at 6 is provided with a bifurcated camway 7, the arms of which are disposed diagonally above and below the center line 8—8. Engaging with this camway is a fixed cam roller 9. When pressure is applied to the arm to raise or lower it, it pivots at 5 and slides in 4. It is caused to slide by the engagement of the roller 9 in the camway 7 with the result that the outer end of the lever 4, when moving from b to a, or from b to c, follows a substantially straight path as its natural arc of movement is compensated for by the compensating cam 7. I thus provide a pivotal sliding support for a lever arm in association with a compensatory cam mechanism, which maintains the outer end of the lever arm in a straight or substantially straight path during its pivotal movement.

The several positions assumed by the lever arm for purposes of illustration are indicated by the lines 10, 11, 8—8, 12 and 13.

Turning to Figure 2, it will be noted a cam, forming a camway is designated 14. This camway engages with the upper and lower sides of the lever 1 and as the lever is conveyed, as by a chain 15, the arm is raised and lowered about its pivotal support 5 in the slide 4. The compensatory movement is effected by the diverging compensatory camway 7 engaging with the fixed roller 9.

Figure 3 shows the layout of the camway 14.

In Figure 4, a horseshoe-shaped compensatory camway 16 is employed, the center of which is a path that must be described by the inner end of the arm 1, in order to cause the outer end 2 to travel in a straight line. A lever 17 is pivotally connected to the arm 1 at its inner end 6, so as to cause the arm 1 to slide in the slide 4 and to pivot about the pivotal support 5.

In Figures 5, 6 and 7 a similar mechanism is employed. In Figure 6 there is a half-circle cam 18 with a crank arm 17, which is slidably mounted in its support 17a. In Figure 7 the pivotal arm 17 is provided for a half-circle crank with a pivot and slide movement.

Turning to Figure 8, which shows a practical application of this mechanical movement in electroprocessing machines, it will be noted that the chain 15, which is the usual conveyor chain alongside of the tanks 19, is supported upon a cam trackway 20. The chain pivotally supports at 5 the slide 4 for the arm 1. The arm is provided with a roller 1a, which rides upon the cam trackway 14 for raising and lowering the arm.

The inner end of the arm is provided with a roller 9 engaging between the cam trackway 7 so that the arm is slidably moved within the slide 4 in order to maintain the outer end 2 in a straight-line movement, as the arm is raised and lowered by the cam 14.

In this way I am enabled to provide several movements: A swinging movement of the arm 1 with the outer end of the arm always in a straight line or substantially straight line; a transverse movement of the arm along the tanks in a generally horizontal plane; a pivotal and slidable movement of the arm with respect to the chain as effected by raising and lowering, and compensatory cams.

It will be understood that I desire to comprehend within my invention such modifications as may be necessary to adapt it to varying conditions and uses.

Having thus fully described my invention, what I claim as new and desire to secure by Letters Patent, is:

1. In combination, an arm having a bifurcated cam trackway disposed on the inner end of said arm, a cam engaging means adjacent the inner end of the arm for engaging said cam trackway, and means to reciprocally and pivotally support said arm, whereby the arm will be caused by said cam to reciprocate, so that the outer end of the arm will travel in a substantially straight line.

2. In combination, an arm having a bifurcated cam trackway disposed on the inner end of said arm, a cam engaging means adjacent the inner end of the arm for engaging said cam trackway, and means to reciprocally and pivotally support said arm, whereby the arm will be caused by said cam to reciprocate, so that the outer end of the arm will travel in a substantially straight line, and a second cam engaging with said arm, adapted to move the arm about its pivotal support.

3. In combination, a supporting arm, means of pivotally and slidably supporting said arm, compensatory cam means on the inner end of said arm for causing said arm to move reciprocally in its sliding support, and elevating and lowering cam means to cause said arm to move about its pivotal support.

4. In combination, a supporting arm, means of pivotally and slidably supporting said arm, compensatory cam means on the inner end of said arm for causing said arm to move reciprocally in its sliding support, and elevating and lowering cam means to cause said arm to move about its pivotal support, and conveying means for conveying said arm in its pivotal and slidable support.

5. In combination, a supporting arm, means of pivotally and slidably supporting said arm, compensatory cam means on the inner end of said arm for causing said arm to move reciprocally in its sliding support, and elevating and lowering cam means to cause said arm to move about its pivotal support, and conveying means for conveying said arm in its pivotal and slidable support, and means for engaging said compensatory cam means continuously as the arm is so conveyed.

VAN WINKLE TODD.